CHROMA CONVERTER

Filed Aug. 1, 1956

INVENTOR.
ROBERT B. HANSEN
BY Alan J. Mitchell
ATTORNEY

INVENTOR.
ROBERT B. HANSEN
BY
ATTORNEY

United States Patent Office 3,023,271

Patented Feb. 27, 1962

3,023,271

CHROMA CONVERTER

Robert B. Hansen, Merchantville, N.J., assignor to Radio Corporation of America, a corporation of Delaware Filed Aug. 1, 1956, Ser. No. 601,498
5 Claims. (Cl. 178—5.4)

This invention relates to circuits, which are especially useful in color television receivers, for demodulating a suppressed carrier, two-phase amplitude-modulated chroma or chrominance signal. Such a signal consists of two sets of sideband frequency components disposed about a suppressed carrier frequency. The two sets of sideband frequency components carry two different color information in the form of amplitude variations at two different phases. To demodulate or derive the two color informations from the chrominance signal, it is necessary to employ two demodulators to mix the signal in proper phase relations with oscillations having the frequency of the suppressed carrier. According to this invention there is provided a simplified combination synchronized oscillator and synchronous demodulator circuit providing two outputs corresponding with the two color informations.

The color television standards adopted by the Federal Communications Commission on December 17, 1953 provide that a broadcasted radio frequency carrier be modulated with a brightness or luminance signal having frequency components from zero to 4.1 megacycles, and with a chrominance or chroma signal having sideband frequency components extending from 2 to 4.1 megacycles and related to a suppressed color subcarrier frequency of 3.58 megacycles. The chroma signal consists of two sets of sideband frequency components, the two sets representing variation in color saturation along two different respective hue axes of the chromaticity diagram. The nature of the two phase chroma signal is more completely described starting at page 216 of Color Television Engineering, J. W. Wentworth, McGraw-Hill, 1955. In order to demodulate the chroma signal in a receiver, it is necessary to insert an oscillation having the frequency of the suppressed color subcarrier. For this purpose, the back porch of each of the transmitted synchronizing pulses is modulated with a burst of at least eight cycles of the color subcarrier frequency; and at the receiver, the burst is used to control the frequency and phase of a local color subcarrier oscillator. The output of the oscillator and the received chroma signal are applied in proper phase to a plurality of synchronous demodulators. The outputs of the demodulators are matrixed to produce signals for application to a picture reproducer, such as a three-gun shadow mask color kinescope.

It is an object of this invention to provide an improved and simplified circuit for performing the functions of generating synchronized oscillations and demodulating a suppressed carrier, two-phase amplitude-modulated signal.

It is another object to provide an improved and simplified burst controlled oscillator and two-signal synchronous demodulator.

It is a further object to provide an improved color television receiver system including a combination color subcarrier oscillator and synchronous demodulator.

An arrangement which is illustrative of the invention and which is useful in a color television receiver may be termed a chroma converter. The converter includes an electron discharge means having two electron paths. The two paths may be provided by two vacuum tubes, or by a single vacuum tube having two electron paths with some electrodes common to both paths, other electrodes associated solely with one path, and still other electrodes associated solely with the other path. A source of a color subcarrier burst signal and frequency determining elements are coupled to electrodes associated with both of the electron paths to form an oscillation generating circuit wherein the electrons in both of the two paths are modulated at the color subcarrier frequency. The burst controlled oscillation generating circuit may be of the injection lock type, the ringing circuit type, or the reactance tube controlled type. A chroma signal is applied in one phase to electrodes associated with one of the electron paths, and is applied through a phase shifter or delay means to electrodes associated with the other electron path. Two demodulated signals are obtained from output electrodes associated with the two respective paths. These signals are matrixed and applied to a picture reproducer such as a three-gun shadow mask kinescope.

These and other objects and aspects of the invention will be apparent to those skilled in the art from the following more detailed description taken in conjunction with the appended drawings wherein:

FIGURE 3 is a circuit diagram of an alternative chroma converter which may be substituted in the receiver system of FIGURE 1.

Figures 1, 2:
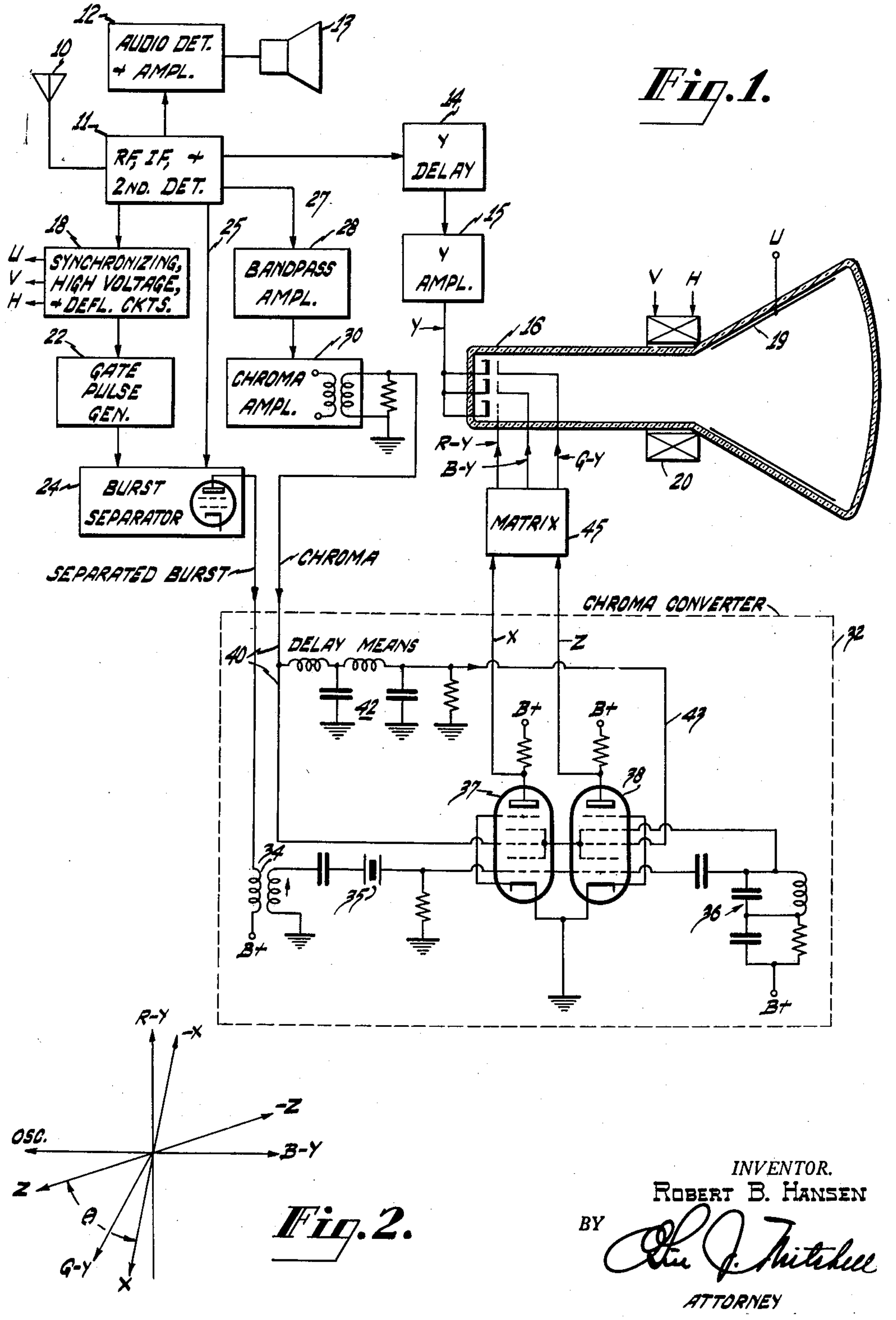
FIGURE 1 is a diagram of a color television receiver constructed according to the teachings of this invention.
FIGURE 2 is a vector diagram which will be referred to in describing the operation of the invention.
Figure 7:
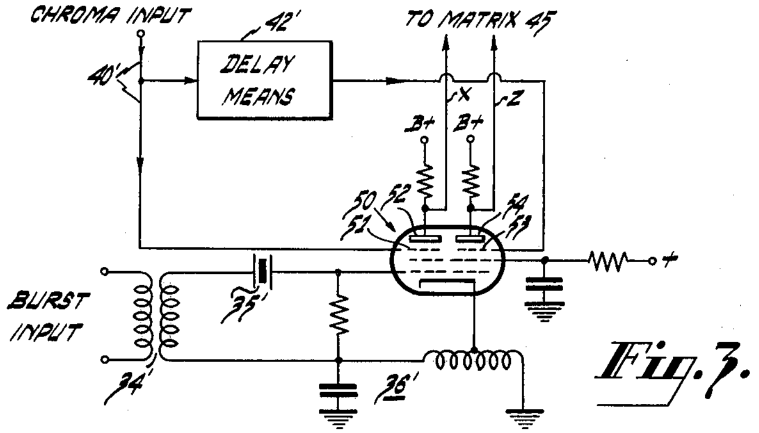

FIGURE 1 shows a color television receiver wherein conventional circuit elements are represented in block diagram form and wherein the improved portion according to this invention is shown in circuit diagram form. A radio frequency color television signal is received by an antenna 10 and applied to a portion 11 of the receiver which includes a radio frequency amplier, the first detector, an intermediate frequency amplifier, and a second detector. A portion of the video signal from the second detector is applied to an audio detector and amplifier 12 which drives a loudspeaker 13 to reproduce the audible portion of the television signal.

Another output from the second detector in the block 11 is applied through a Y delay means 14 and a Y amplifier 15 to the cathodes of three guns in a color kinescope 16. The Y signal carries the luminance or brightness information.

Another portion of the video signal from the second detector in block 11 is applied to synchronizing, high voltage, and deflection circuits 18. An output U from the circuits 18 is applied as a high voltage to the ultor 19 of the kinescope 16. Vertical and horizontal scanning signals V and H are applied from the circuits 18 to the deflection means 20 associated with the kinescope 16. A fourth output from the circuits 18 is applied to a gate pulse generator 22 which provides pulses corresponding in time with the color subcarrier bursts occurring on the back porch of the received synchronizing pulses. The output of the gate pulse generator 22 is applied to a burst separator 24. A portion of the video signal from the second detector in the block 11 is also applied over lead 25 to the burst separator 24. The burst separator 24 provides an output consisting solely of the color subcarrier frequency bursts.

A fifth output from the second detector in the block 11 is applied over a lead 27 to a band pass amplifier 28. The band pass amplifier 28 is preferably designed to pass frequency components in the range between 2.0 megacycles and 4.1 megacycles. This frequency range includes the chrominance or chroma signal components of the color television signal. The output of the band pass amplifier 28 is amplified in a chroma amplifier 30.

The separated bursts provided at the output of the burst separator 24, and the chroma signal provided at the output of the chroma amplifier 30 are applied to a chroma converter included within the dotted line box 32. The term "chroma converter" is applied to a combination burst controlled oscillation generator and two-phase synchronous demodulator or detector.

Separated bursts from the burst separator 24 are applied through a transformer 34 to an oscillation generating circuit including a piezo electric crystal 35, a tank circuit 36, and certain of the electrodes of pentagrid vacuum tubes 37 and 38. The vacuum tubes may be Type 6BY6 vacuum tubes. Alternatively, the electrodes of vacuum tubes 37 and 38 may be constructed within a single vacuum envelope and arranged to provide two electron paths from a common cathode; some of the grids being common to both paths, and the anode and others of the grids being associated with respective ones of the two paths. In the oscillation generating circuit of FIGURE 1, the two electron paths are provided by two separate vacuum tubes 37 and 38. The cathodes of both tubes are connected together, the first grids are connected together, and the third and fifth grids are similarly connected together. These electrodes are coupled to frequency determining elements including the piezo electric crystal 35 and the tank circuit 36 to generate oscillations at a frequency and a phase determined by that of the bursts applied through the transformer 34.

The chroma signal from the output of the chroma amplifier 30 is applied through a lead 40 to the third grid of the vacuum tube 37. The chroma signal from the lead 40 is also applied through a delay means 42 and the lead 43 to the third grid of the vacuum tube 38. The delay network 42 may be a lumped constant network as shown in the drawing, or may be a section of transmission line, or may be any other suitable phase shifting device. The chroma signal in the two different phases determined by the delay means 42 is mixed in both vacuum tubes 37 and 38 with the oscillations of the oscillation generating circuit by electron coupling. Two demodulated signals are produced at the anodes of the respective tubes 37 and 38, and are applied over leads designated X and Z to a matrix circuit 45. The matrix circuit 45 has three outputs designated $R-Y$, $B-Y$ and $G-Y$ which are applied to the control grids of the red, blue, and green guns in the color kinescope 16. The Y signal applied to all the cathodes combines in the kinescope with the $R-Y$, $B-Y$ and $G-Y$ signals applied to the respective grids to modulate the three beams in accordance with the original red, blue and green signals at the transmitter. Any one of several known matrix circuits may be employed in the box 45. Alternatively, the adding function performed in the kinescope may be performed in a circuit which also performs the function of matrix 45. The level of the signals from the chroma converter 32 is such that some amplification is necessary between the chroma converter and the kinescope 16.

The color television receiver system of FIGURE 1 differs from the usual arrangement in that the demodulation in the two tubes 37 and 38 is accomplished by applying chroma signals of different phases to the respective tubes, and by applying oscillations of the same phase to the two tubes. The phases of the various signals may be as represented in FIGURE 2. The phase of the oscillations is represented by a vector extending to the left. The phase of the oscillations is related to the phase of the bursts by an adjustable fixed nominal phase angle. The chroma signal is demodulated in the two tubes 37 and 38 at two respective phases represented by the vectors X and Z respectively. The phases of X and Z are separated by an angle $\theta$. This phase difference is provided by the delay means 42. If an angle $\theta$ of about 60 degrees is employed, the corresponding delay required at 3.58 megacycles is in the order of 0.04 microsecond. This delay is easily provided by one or two filter sections. The invention may, of course, be employed to demodulate on other axes than those illustrated by way of example in FIGURE 2. The matrix 45 receives the X and Z signals from the chroma converter 32 and produces three color-difference signals for application to the kinescope 16. It can be seen from FIGURE 2 that the $R-Y$ difference signal may be generated by combining portions of the Z signal and the $-X$ signal. The $B-Y$ signal may be generated by combining portions of the X and $-Z$ signals. The $G-Y$ signal may be generated by combining portions of the X and Z signals.

The particular matrix circuit 45 employed should be one appropriate to the particular axes or angles of demodulation in the chroma converter 32. For example, if the axes of demodulation are the $R-Y$ and $B-Y$ axes, rather than the Z and X angles shown in FIGURE 2, the matrix 45 may be the matrix amplifier included in FIGURE 22 on page 311 of the March 1956 issue of the Proceedings of the IRE.

FIGURE 3 shows an alternative circuit arrangement of a chroma converter which may be substituted in the dotted line box 32 of FIGURE 1. The vacuum tube 50 in the circuit of FIGURE 3 may be a type 6BU8 vacuum tube having a cathode, a first grid, and a second grid common to two electron paths. A third grid 51 and an anode 52 are associated solely with one of the electron paths, and a third grid 53 and an anode 54 are associated solely with the other of the two electron paths. Separated bursts are applied through a transformer 34′ to an oscillation generating circuit including a piezo electric crystal 35′, a tank circuit 36′ and the cathode, first grid and second grid electrodes of the vacuum tube 50. The oscillation generating circuit produces a modulation of the electrons in the two paths following the second grid.

The chroma input signal is applied over lead 40′ to the grid 51, and through the delay means 42′ to the grid 53. The two demodulated signals X and Z are obtained from the anodes 52 and 54, respectively, and are applied to the matrix 45. The arrangement of FIGURE 3 employs a single vacuum tube envelope in a circuit which generates burst controlled oscillations and also demodulates the chroma signal to provide two outputs at a phase difference determined by the delay means 42′.

Figure 4:
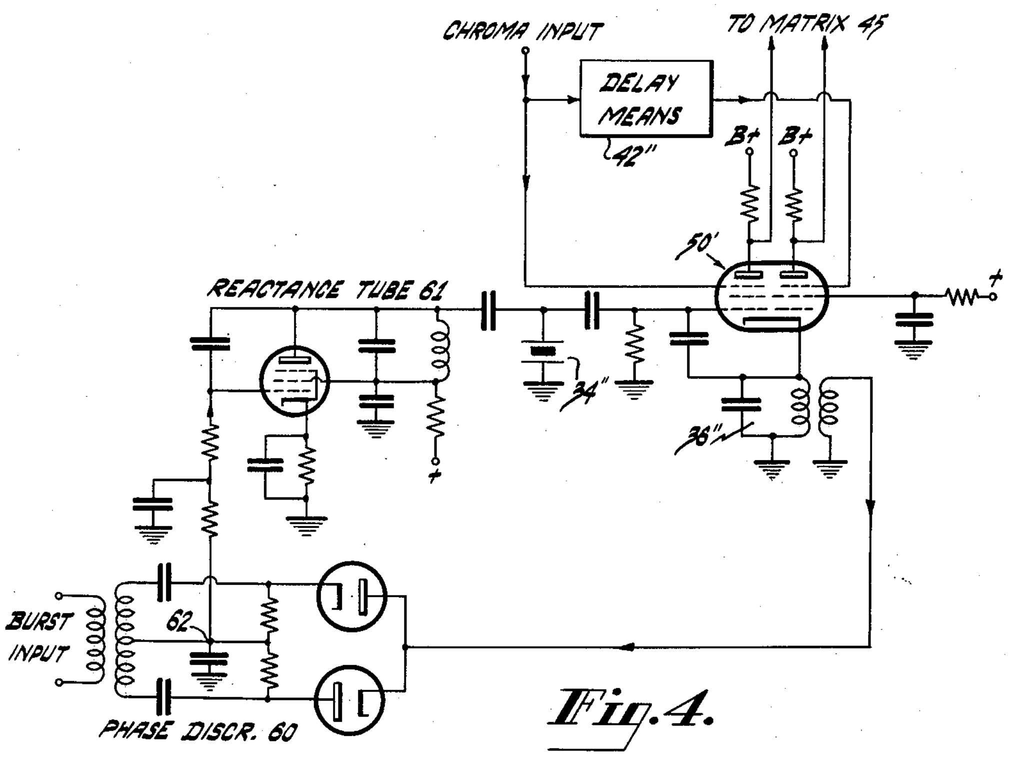
FIGURE 4 is another alternative circuit arrangement according to the invention which may be substituted in the system of FIGURE 1.

FIGURE 4 illustrates a third circuit arrangement embodying the teachings of this invention. Frequency determining elements constituted by a piezo electric crystal 34″ and a tank circuit 36″ are coupled to the cathode, first grid, and second grid of a vacuum tube 50′ which is similar to that described in connection with FIGURE 3. The chroma signal is applied to the vacuum tube 50′ in the same manner as that described in connection with FIGURE 3.

The frequency and phase of the oscillation generating circuit is controlled by the burst input signal through the medium of a phase discriminator 60 and a reactance tube circuit 61. The phase discriminator compares the burst input signal with the oscillations in the tank circuit 36″. When a phase difference exists, a correction signal is generated at the point 62 in the phase discriminator 60 and is applied to the reactance tube circuit 61. The reactance tube 61 then changes the phase (or frequency) of the oscillation generating circuit in the proper direction to make the frequency and phase of the oscillations equal to that of the burst signal.

It is apparent that according to this invention, improved and simplified circuit means are provided for performing the functions of generating burst controlled oscillations and for demodulating both phases of a two phase suppressed carrier signal.

What is claimed is:

1. In a color television receiver, a source of a chrominance signal comprising a modulated color subcarrier, an electron discharge device having two electron discharge paths and including electrodes common to both of said paths and electrodes exclusively associated with respective ones of said paths, means to couple the output of said source to an electrode exclusively associated with one of said paths, a delay means coupling the output of said source to an electrode exclusively associated with the other of said paths, a source of bursts of oscillation having a frequency equal to the frequency of said color subcarrier, means coupled to said source of bursts and including frequency determining elements intercoupling electrodes common to both of said paths for utilizing said electron discharge device to generate oscillations of color subcarrier frequency in synchronism with said bursts, first output circuit means coupled to an output electrode exclusively associated with said one of said paths for deriving a first color difference signal, and second output circuit means coupled to an output electrode exclusively associated with said other of said paths for deriving a second color difference signal.

2. A color television receiver comprising, means to demodulate a received radio frequency signal to produce a video signal having a luminance portion, a chrominance portion, and a synchronizing portion which includes color subcarrier bursts related to the chrominance portion, burst separator means coupled to said first-named means, a chrominance amplifier coupled to said first-named means, an electron discharge device having two electron discharge paths and including a cathode, a first control grid, and a screen grid common to both of said paths and additional electrodes exclusively associated with respective ones of said paths, said additional electrodes exclusively associated with respective ones of said paths including respective second control grids and respective anode means to couple the output of said chrominance amplifier to the second control grid exclusively associated with one of said paths, a delay means coupling the output of said chrominance amplifier to the second control grid exclusively associated with the other of said paths, an oscillation generating circuit responsive to the output of said burst separator means and including frequency determining elements intercoupling the cathode, first control grid and screen grid common to both of said paths, a first output circuit coupled to the anode exclusively associated with said one of said paths for developing a first color difference signal output, and a second output circuit coupled to the anode exclusively associated with the other of said paths for developing a second color difference signal output.

3. In a color television receiver including a source of chrominance signal comprising modulated color subcarrier waves and a source of color synchronizing bursts of color subcarrier frequency, color subcarrier wave demodulating apparatus comprising the combination of first means for establishing a flow of electrons to a first output electrode, second means for establishing a flow of electrons to a second output electrode, means associated exclusively with said first electron flow establishing means for modulating the electron flow to said first output electrode, means associated exclusively with said second electron flow establishing means for modulating the electron flow to said second output electrode, means coupled to said chrominance signal source for applying said chrominance signal to said first named electron flow modulating means, means including signal delay apparatus for coupling said chrominance signal source to said second named electron flow modulating means, said signal delay apparatus serving to delay the appearance of said modulated color subcarrier waves at said second named electron flow modulating means relative to the appearance of said modulated color subcarrier waves at said first named electron flow modulating means, means for utilizing both of said first and second electron flow establishing means to sustain the generation of local oscillations at a frequency nominally equal to said color subcarrier frequency, said last named means serving to introduce said local oscillations into both the electron flow to said first output electrode which is subject to the action of said first named electron flow modulating means and the electron flow to said second output electrode which is subject to the action of said second named electron flow modulating means, and means coupled to said color synchronizing burst source for synchronizing the local oscillations sustained by both of said electron flow establishing means.

4. Demodulation apparatus in accordance with claim 3 wherein said first electron flow establishing means comprising a first electron discharge device having a cathode, an anode and a plurality of grids; wherein said second electron flow establishing means comprises a second electron discharge device having a cathode, an anode and a plurality of grids, the anode of said first electron discharge device serving as said first output electrode, the anode of said second electron discharge device serving as said second output electrode, a predetermined one of said plurality of grids of said first electron discharge device serving as said first electron flow modulating means, a corresponding one of said plurality of grids of said second electron discharge device serving as said second electron flow modulating means; and wherein said oscillation generation sustaining means comprises means for interconnecting the cathodes and others of said plurality of grids of said first and second electron discharge devices to establish a common cathode terminal and a plurality of common grid terminals, means for coupling a first resonant circuit nominally tuned to said color subcarrier frequency between one of said established common terminals and a point of reference potential, and means for coupling a second resonant circuit nominally tuned to said color subcarrier frequency between another of said established common terminals and a point of reference potential.

5. Demodulating apparatus in accordance with claim 3 including an electron discharge device having a single cathode and a pair of separate anodes, a first control grid common to a first electron discharge path between said cathode and one of said pair of anodes and to a second electron discharge path from said cathode to the other of said pair of anodes, a second control grid exclusively associated with said first electron discharge path, and a third control grid exclusively associated with said second electron discharge path; and wherein said first output electrode comprises said one anode, said second output electrode comprises said other anode, said first named electron flow modulating means comprises said second control grid, said second named electron flow modulating means comprises said third control grid, and wherein said oscillation generation sustaining means comprises a resonant circuit coupled between said cathode and said common first grid.

References Cited in the file of this patent

UNITED STATES PATENTS

| | | |
|---|---|---|
| 1,884,945 | Willoughby | Oct. 25, 1932 |
| 2,538,261 | Moore | Jan. 16, 1951 |
| 2,884,522 | Graser | Apr. 28, 1959 |
| 2,909,595 | Schlesinger | Oct. 20, 1959 |
| 2,927,151 | Loughren | Mar. 1, 1960 |

FOREIGN PATENTS

| | | |
|---|---|---|
| 1,065,692 | France | May 28, 1954 |